A. B. NIX.
SPRING TIRE FOR VEHICLE WHEELS.
APPLICATION FILED OCT. 15, 1918.

1,341,576.

Patented May 25, 1920.

Inventor:
Allen B. Nix
per E. K. Longley
Attorney

UNITED STATES PATENT OFFICE.

ALLEN B. NIX, OF NEAR HOWARD, KANSAS.

SPRING-TIRE FOR VEHICLE-WHEELS.

1,341,576.  Specification of Letters Patent.  Patented May 25, 1920.

Application filed October 15, 1918. Serial No. 258,303.

*To all whom it may concern:*

Be it known that I, ALLEN B. NIX, a citizen of the United States, residing near Howard, in the county of Elk and State of Kansas, have invented a new and useful Spring-Tire for Vehicle-Wheels, of which the following is a specification.

This invention has reference to a spring tire for vehicle wheels.

The object of the invention is to produce a tire entirely constructed of metal having a resiliency sufficient to absorb all shocks and jars to which the wheel is subjected and consequently produce a tire which will practically have all of the advantages of a pneumatic tire and which will eliminate the disadvantages of such tires.

A further object of the invention is to produce a spring tire in the nature of a split band constructed of a plurality of angularly disposed members, the said band being of a length to properly encircle the rim of a wheel and having means whereby the ends thereof may be easily and conveniently connected to the rim and felly of the wheel.

A further object of the invention is to produce a spring tire comprising a plurality of connected plates, each of which being formed with an arched portion having an offset end, the offset end portion of each of the sections being connected to the arched portion of the adjacent or co-acting section, while means is employed for securing the tire on the felly of a wheel.

A further object of the invention is to produce a device of this character in which a flanged rim is employed and in which the connected ends of the spring elements constituting the tire are arranged whereby lateral movement of the tire will be prevented, and also whereby a limited yielding movement of the sections constituting the tire will be permitted.

Other objects and advantages will present themselves as the nature of the invention is better understood, reference being had to the accompanying drawings, in which.

Figure 1:
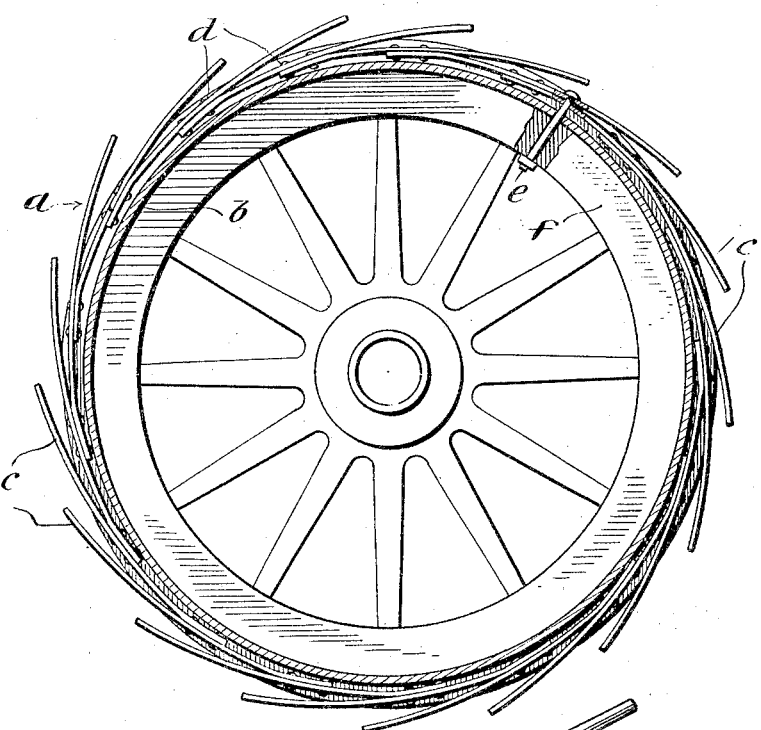
Figure 1 is a side elevation of a vehicle wheel illustrating the application of the improvement, parts being broken away and parts being in section.

In the drawings $f$ indicates a wheel felly on which is arranged a rim $b$, the same having its edges provided with outstanding continuous flanges.

Between the flanges is arranged my improved spring tire which is broadly indicated by the character $a$. The sections constituting the tire are in the nature of leaf springs, each comprising a plate $c$ which is arched for the major portion of its length but which has one of its ends arranged angularly or offset with respect to the arched portion thereof. The offset ends of the leaf springs are provided with spaced openings $g$, as are also the arched portions thereof.

In assembling the tire, the offset ends of the leaf springs are arranged under and in contacting relation with the leaf springs to which they are connected. The offset end of each spring is brought to register with the openings $g$—$g$ in the arched portion of the overlying leaf spring and connecting means $d$—$d$ are inserted through such registering openings. One of the overlying leaf springs is provided with an additional opening outward of the openings $g$ in the arched portion thereof and this opening registers with an opening in the arched portion of the underlying leaf spring. Passing through these last mentioned registering openings as well as through registering openings in the rim $b$ and felly $f$ is a securing bolt $e$ which fastens the tire to the wheel. This bolt is engaged by a nut, as illustrated in Figs. 1 and 2 of the drawings, and in this manner the tire is secured to the wheel.

Figure 2:
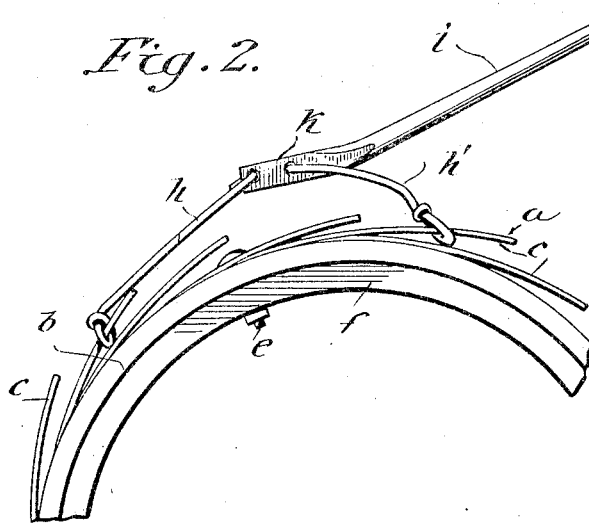
Fig. 2 is a similar view, illustrating the manner in which the end sections of the tire are secured to the rim and felly of the wheel.
Figure 3:
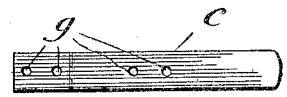
Fig. 3 is a plan view of one of the leaf spring members of the tire.

In applying my improvement to a wheel I have found it necessary to employ a tool of a peculiar construction, such as is illustrated in Fig. 2 of the drawings. This tool constitutes a lever $i$ which has one of its ends widened as at $k$, and which has secured at the said widened end links $h$ and $h'$, the latter having their free ends looped. The leaves, adjacent to the end leaves of the tire are engaged by the loops of the members $h$ and $h'$ and the lever is swung outwardly of the wheel to bring the ends of the tire together. The lever is held in such position until the openings in the end leaves of the tire register, when the bolt $e$ is inserted through the openings in the said end leaves.

From experience I have found that my tire can be cheaply constructed and the particular and peculiar arrangement of the leaf springs, especially with respect to the connections therebetween, and also the arrangement of the tire in the groove or between the flanges of the rim prevent the accumulation of dirt or foreign matter between the leaf springs, any such accumulation being removed by the yielding of the leaves, and also that the tire is held effectively against lateral movement by its contacting engagement with the flanges of the rim. In other words, the width of the leaf springs is substantially equal to the distance between the flanges of the rim. In Fig. 1 of the drawings I have shown the elements $d$ passing through the end leaf springs of the tire. This is not an absolute necessity, and as a matter of fact the bolt $e$ is sufficient to connect the end leaf springs. However, when the same are connected as shown by the elements $d$, the said elements are passed through the openings in the lower or underlying leaf spring and are permitted to pass through the openings in the overlying leaf spring. When the latter is brought against the underlying leaf spring the elements may be headed by the ordinary tool spaced between the lapping springs, but preferably, when means is employed for connecting the said end springs, said means is in the nature of nuts and bolts. It will be apparent that the nuts may be readily screwed on the projecting ends of the bolts that pass through the overlying leaf spring.

It is thought, from the foregoing description, when taken in connection with the drawings, the simplicity of the construction and the advantages thereof will be readily apparent without further detailed description.

Having thus described the invention, what is claimed as new, is:—

In combination with a felly of a vehicle wheel and a flanged rim thereon; of a tire constructed of a plurality of leaf spring members each embodying an arched portion having an offset end and the offset end of each leaf spring underlying the arched portion of the adjacent spring and secured thereto and means passing through the arched portions of one pair of underlying and overlying springs for securing the tire to the rim and felly.

ALLEN B. NIX.